United States Patent [19]
Zook

[11] Patent Number: 5,645,743
[45] Date of Patent: Jul. 8, 1997

[54] MULTIPLE HEAT SOURCE GRID ASSEMBLY

[75] Inventor: Jon C. Zook, Hendersonville, Tenn.

[73] Assignee: Illinois Tool Works Inc., Glenview, Ill.

[21] Appl. No.: 441,471

[22] Filed: May 18, 1995

[51] Int. Cl.⁶ ................................................ F27B 14/00
[52] U.S. Cl. .................... 219/422; 222/23; 222/146.5
[58] Field of Search .............................. 219/420, 421, 219/422, 423, 424, 425; 222/146.5, 146.7, 146.6, 23

[56] References Cited

U.S. PATENT DOCUMENTS

| | | |
|---|---|---|
| 3,964,645 | 6/1976 | Scholl . |
| 3,981,416 | 9/1976 | Scholl . |
| 4,009,974 | 3/1977 | Scholl . |
| 4,456,151 | 6/1984 | Lewellen . |
| 4,474,311 | 10/1984 | Petrecca . |
| 4,667,850 | 5/1987 | Scholl et al. . |
| 4,771,920 | 9/1988 | Boccagno et al. . |

*Primary Examiner*—Tu B. Hoang
*Attorney, Agent, or Firm*—Dvorak and Traub

[57] ABSTRACT

An apparatus for the melting of solid and quasi-solid materials, such as thermoplastics and hot melt adhesives, is disclosed. The grid type melter includes one or more heating fins and melt spaces. Multiple heating elements lying in separate planes are disposed in the heating fins and the base in a manner which results in a relatively even temperature distribution along heating surfaces. Degradation of melted material is avoided and material flow rate is improved due to even heat transfer to the material.

7 Claims, 2 Drawing Sheets

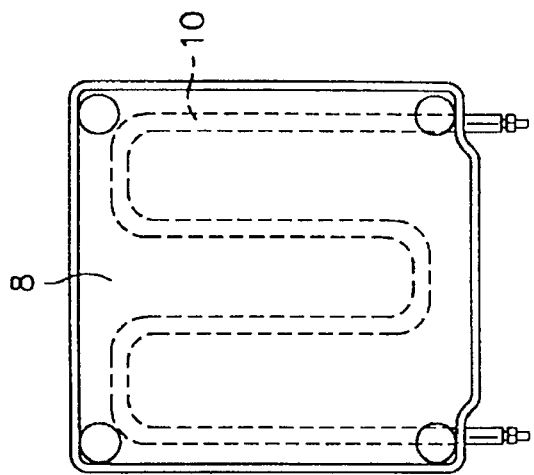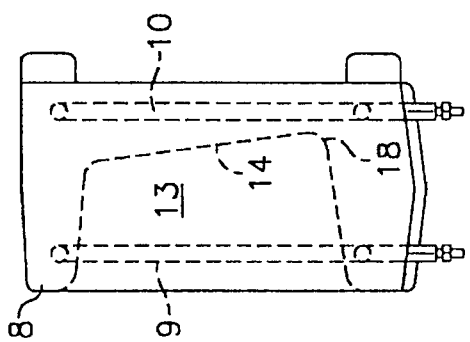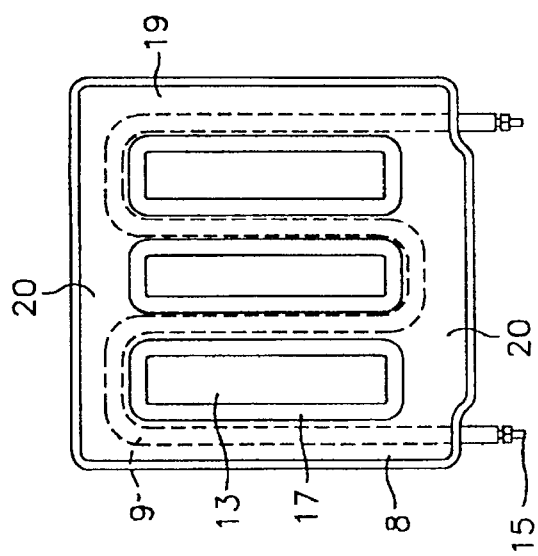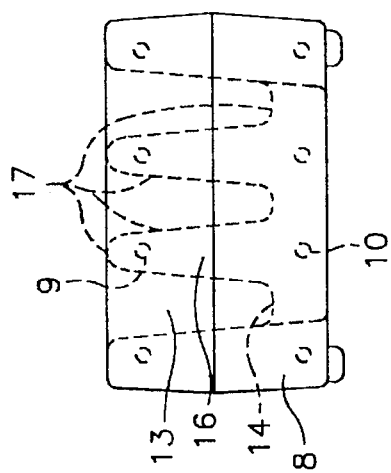

MULTIPLE HEAT SOURCE GRID ASSEMBLY

Cross Reference To Related Applications

This application is related to four copending applications entitled:

"Viscous Fluid Shut Off Valve and Filter"; U.S. Ser. No. 08/441,385

"Removable Hopper Cover"; U.S. Ser. No. 08/441,648

"Heat Dissipating Chimney for Adhesive Supply Unit"; and U.S. Ser. No. 08/440,649

"Adhesive Supply Unit" U.S. Ser. No. 08/038,886

BACKGROUND OF THE INVENTION

1. Field of the Invention

This invention relates to an apparatus for receiving thermoplastic and other hot melt materials and adhesives, melting the material, and supplying the melted material to a dispenser. Heat is supplied to the material in a carefully controlled manner through a series of multiple heat sources so as to ensure rapid and even heating and subsequent melting of the material.

2. Description of the Related Art

In the past, hot melt materials were converted from a solid or quasi-solid state to a flowable melted state by placing the unmelted material in a container having heated walls, whereby heat would travel from the wall, first through the material closest to the wall, and eventually to the center region, thereby melting all of the material. This system suffered certain drawbacks, in that the material closest to the walls was exposed to an excess of heat, thereby degrading or harming the material. Also, the time required to melt the entire batch of material was unsatisfactorily long.

Improvements in the form of grid type melters, whereby the material was melted in a heated grid, travelling then to a holding reservoir, for supplying to a dispenser, solved some of the problems experienced in the heated wall container type melters. However, these grid type melters also suffered certain drawbacks, in that the heat supplied to the material was uneven, resulting in the same and similar problems experienced in the previous devices. Generally, these prior art devices lacked the means by which heat may be transferred evenly to heat conducting surfaces contacting the material to be melted. Specifically, the prior art melters generally exhibit heating sources and elements which are at right angles to the heat exchange surfaces or fins. Also, the prior art utilizes heating sources which generally lie in a single plane at the base of the heat exchange element, and do not disclose heating sources provided at locations in the heat exchange element in such a manner that the heat exchange surfaces are all maintained within relatively close temperature ranges. The problems associated with uneven temperature distributions along heating surfaces in grid type melters have not been addressed or solved in the prior art.

It is therefore an object of the present invention to provide an improved grid type melter which addresses and solves the problems associated with uneven heating of materials to be melted. Specifically, the present invention provides a system for maintaining the heat exchange surfaces of a melter within a relatively narrow temperature range. The shape of the heat exchange surfaces of the present invention are arranged in such a manner that the material to be melted is exposed to relatively large heat exchange surfaces, in aggregate. The results are that the material is more evenly and rapidly melted, thereby maintaining the integrity of the material, and optimizing the flow of the material through the melter.

BRIEF DESCRIPTION OF THE DRAWINGS:

FIG. 2 is a plan view of the melter.

FIG. 3 is a cross-sectional view of the melter taken at line A—A of FIG. 2.

FIG. 4 is a cross-sectional view taken at line B—B of FIG. 2.

FIG. 5 is a bottom view of the melter showing the serpentine shape of the heating elements.

Figure 1:
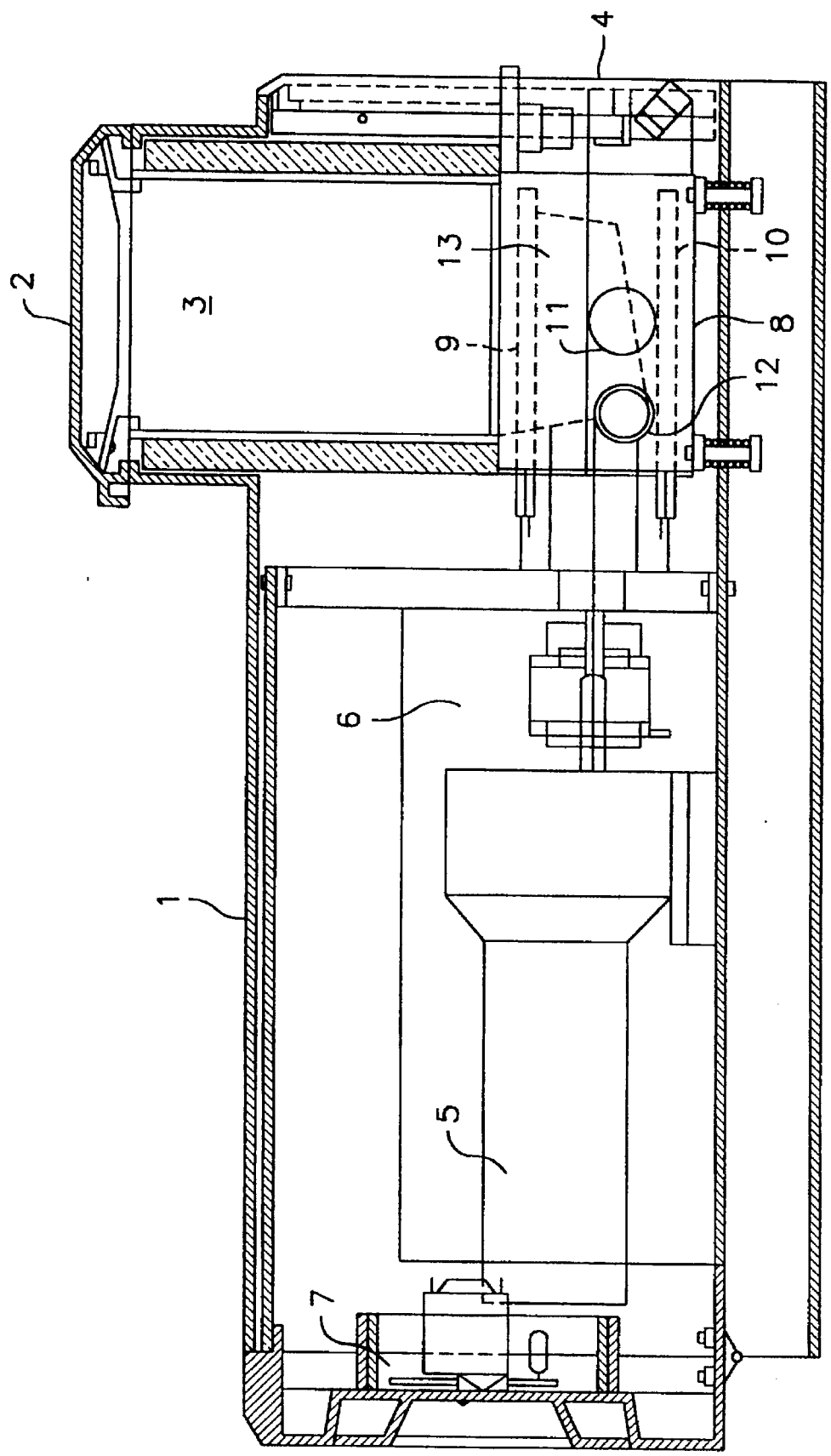
FIG. 1 is a side view of the present invention illustrating the entire melting/dispensing apparatus.

DESCRIPTION OF THE PREFERRED EMBODIMENTS:

Referring to the drawings, FIG. 1 shows a material melting and dispensing apparatus 1 having a material hopper 3 and hopper cover 2. Solid and quasi-solid material to be melted, such as hot melt adhesive pellets, are added to the hopper 3. Heat is supplied to the melter body 8 through the upper and lower heating elements 9 and 10. The melted material is drawn through the shut off valve and filter 12 and is subsequently pumped by pumping means, the pumping means being driven by the prime mover 5 through the coupling 6. Feedback is provided by the temperature sensing means 11, and control of the process is maintained by the control panel 7. The material is dispensed as needed through the shut-off valve/filter 12 and eventually through the dispensing means 4.

Referring now specifically to the melter and related apparatus, FIG. 2 shows the melter body 8, which may be in the form of a casting, and which contains upper heating element 9, and lower heating element 10, as shown in FIG. 4. The heating elements 9, 10 receive heating energy via electrodes or energy addition points 15, controlled by temperature sensing means 11. The heating elements may be positioned in a serpentine manner around the material melt spaces 13. Finite element analysis determined that placement of the heating elements in this serpentine manner allows for maintenance of the temperature along the continuous heating surface 17 within a relatively narrow range.

FIG. 3 shows the heating fins 16 containing the upper heating element 9 near the tip and the lower heating element 10 near the base. Again, it is to be noted that the heating surfaces 17 are maintained at a relatively constant temperature as a result of the placement of heating elements 9 and 10. The maintenance of even temperatures along the surfaces 17 is a controlled combination of factors including the heat absorbing characteristics of the material, the shape of the heat transfer surfaces 17, the material and shape of the melter body and heating fins 16, the flow rate of the material to be melted, the energy addition rate, the heating elements 9 and 10, and particularly the placement and shape of these heating elements. The multiple plane placement of heating elements according to the present invention provides a more efficient means for even heating and subsequent melting of materials, in particular hot melt adhesives. It will be noted that although the present embodiment of the invention illustrates heating elements lying in two planes, it would be advantageous in some circumstances to include heating elements in further multiple planes, 3, 4 or more, depending on the distance between adjacent heating element planes and other factors. Also, although a serpentine heating element shape is specifically disclosed, other shapes, such as circular, oval, rectangular, linear, and others, may be utilized.

FIG. 4 shows the sloped material melt space bottom surface 14, whereby melted material at the appropriate temperature and consistency may be withdrawn from the material melt space low point 18. The heating elements are, in this embodiment, arranged in substantially parallel planes, but may be arranged in non-parallel planes depending on factors including the shape of the melter body 8, the fins 16, and the material melt space 13.

FIG. 5 shows the lower heating element 10 which in this embodiment follows a path in its plane substantially similar to the path of upper heating element 9 in its plane. However, these paths may be altered, again depending on factors including the shape of the melter body, the fins 16, and the material melt space 13.

In operation, the melter of the present invention allows for close control of heat energy addition to a material to be melted, in particular a hot melt adhesive. The even distribution of heat throughout the material before, during, and after melting allows for a significant reduction in the degradation of the melted material. Also, flow rates and characteristics of the melted material are improved with a corresponding improvement in adhesive quality and throughput.

A single preferred embodiment of the present invention is described above. However, those skilled in the art will appreciate the various modifications which could be made to the present invention without departing from the scope of the invention. The invention is therefore not limited except by the scope of the appended claims.

I claim:

1. An apparatus for melting solid and quasi-solid material, comprising:
 a melter body, the melter body having a plurality of material melt spaces;
 heating fins disposed adjacent and between the melt spaces;
 the heating fins having a base region and a tip region;
 at least one lower heating element disposed in the melter body adjacent the fin base region;
 at least one upper heating element disposed in the fins adjacent the fin tip region;
 the upper and lower heating elements being disposed in a serpentine shape in the fins and the base region, the heating elements running the entire longitudinal length of each fin;
 wherein heat energy added through the heating elements results in a relatively narrow temperature range over heating surfaces presented to the material before, during, and after melting.

2. An apparatus according to claim 1, wherein the material melt spaces have sloped material melt space bottom surfaces, the longitudinal axes of the sloped bottom surfaces being sloped with respect to a horizontal plane.

3. An apparatus according to claim 2, wherein the upper and the lower heating elements are disposed in parallel planes.

4. An apparatus according to claim 2, wherein the upper and the lower heating elements are disposed in non-parallel planes.

5. An apparatus according to claim 2, wherein the melter body is a cast material, and the heating elements are cast in the melter body.

6. An apparatus according to claim 2, wherein the melter body comprises more than three material melt spaces.

7. An apparatus according to claim 3, wherein the melter body comprises three material melt spaces, the upper and the lower heating elements each being continuously disposed in a serpentine shape through the melter body, the heating elements arranged to extend through a first side wall parallel with and along the entire length of a first material melt space, angle substantially 90° away from the first side wall along a first end wall, angle substantially 90° away from the first end wall in a direction parallel with and along the entire length of a first fin between the first and a second material melt space, angle substantially 90° away from the first side wall along a second end wall, angle 90° away from the second end wall in a direction parallel with and along the entire length of a second fin between the second and a third material melt space, angle substantially 90° towards a second side wall, and then angle substantially 90° into a second side wall towards a second end wall in a direction parallel with and along the entire length of the third material melt space.

* * * * *